Aug. 15, 1939. A. CLAUD-MANTLE 2,169,920
BRACKET FOR AUTOMOBILE ROBE RAILS
Filed June 3, 1938 2 Sheets-Sheet 1
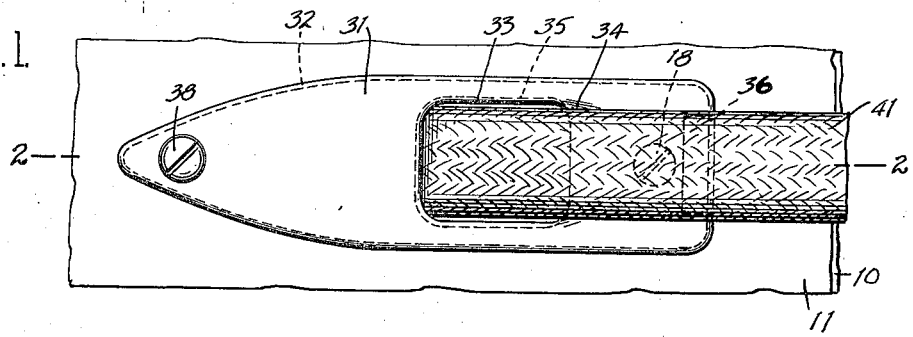
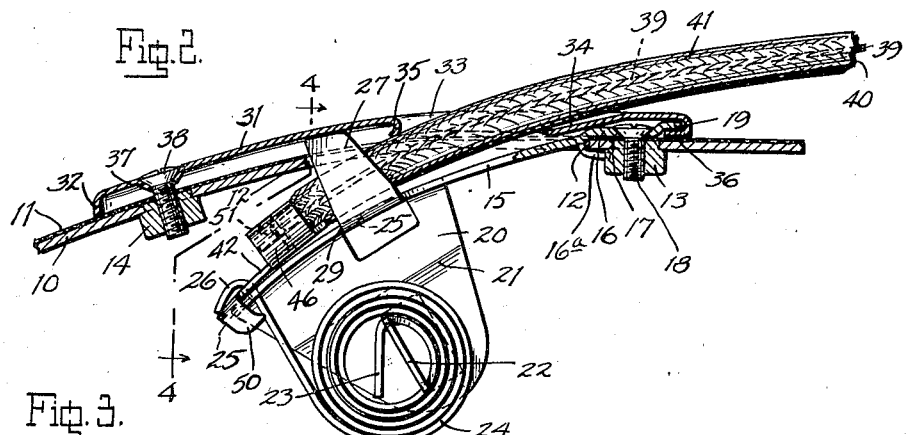
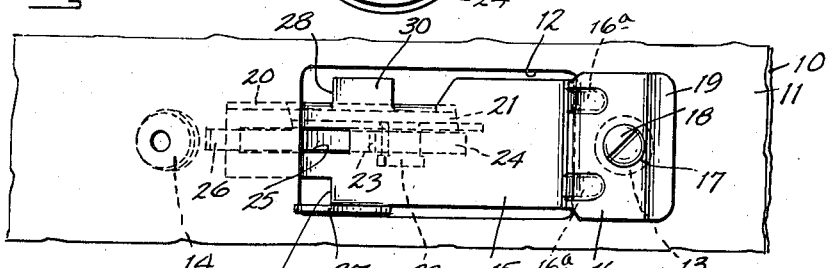
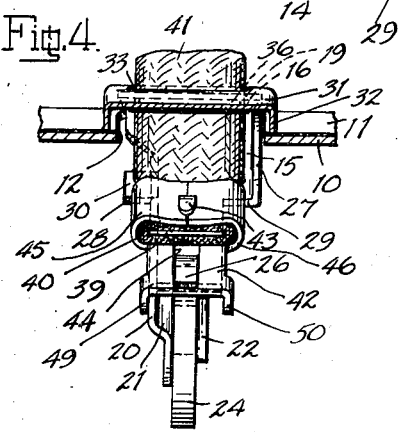
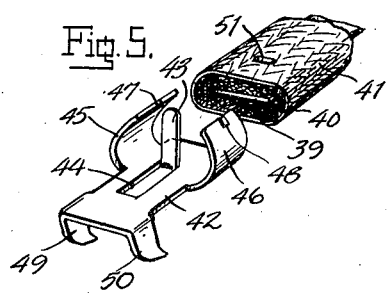
INVENTOR.
ARTHUR CLAUD-MANTLE
BY
ATTORNEY Aug. 15, 1939.  A. CLAUD-MANTLE  2,169,920
BRACKET FOR AUTOMOBILE ROBE RAILS
Filed June 3, 1938  2 Sheets-Sheet 2
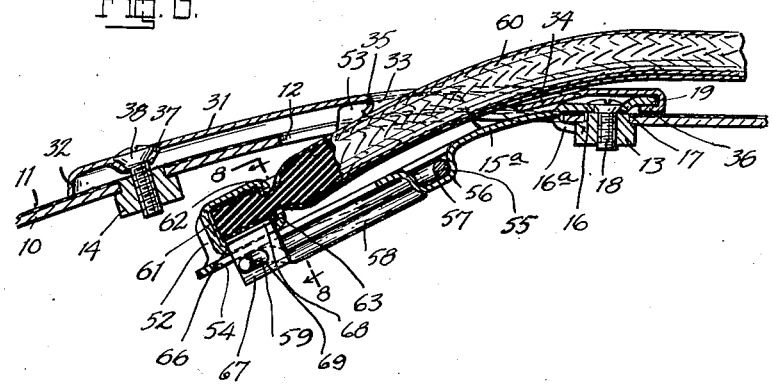
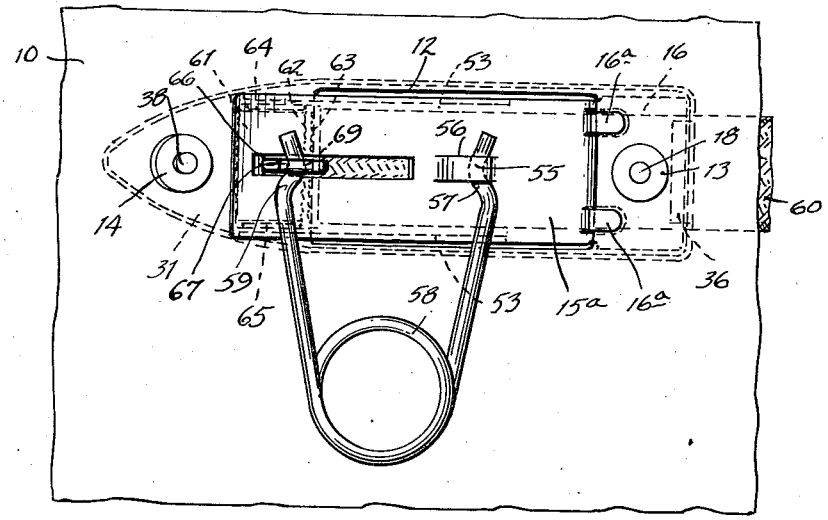
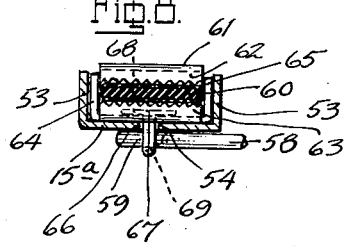
INVENTOR.
ARTHUR CLAUD-MANTLE.
BY
ATTORNEY.

Patented Aug. 15, 1939

2,169,920

UNITED STATES PATENT OFFICE 2,169,920

BRACKET FOR AUTOMOBILE ROBE RAILS

Arthur Claud-Mantle, Trumbull, Conn., assignor to The Bassick Company, Bridgeport, Conn., a corporation of Connecticut Application June 3, 1938, Serial No. 211,480

6 Claims. (Cl. 24—123)

The present invention relates to a bracket for automobile robe rail, particularly of the type in which a non-elastic cord is resiliently mounted at its ends, a bracket of this type being disclosed in my patent for Automobile robe support and bracket therefor, No. 2,031,496, granted February 18, 1936. It is an object of the present invention to provide a bracket which is especially adapted for connection with a robe rail cord of flat cross-section, as distinguished from a cord of circular cross-section. It is a further object to provide a bracket substantially flush with the automobile structure, so that the cord and the exposed part of the bracket will present a minimum projection upon the automobile structure thereby greatly reducing the chance of injury to an occupant of the car in the event that such occupant is forcibly thrown against the bracket. In the event of such an accident the robe rail cord will be disposed in such relation to the bracket as to provide a cushion and buffer against contact with the metal part of the bracket.

A further object is to provide a bracket having improved means for connecting the end of the robe rail cord, such means being disposed within the body structure, but of such design that it can be attached from the outside. A further object is to provide as one embodiment of the invention an improved clip means connected to the end of the robe rail cord and cooperating with a metal ribbon like core provided in the cord to positively lock the clip against displacement through longitudinal pull on the cord, and further to provide such clip means which may be easily and reliably connected to the spring means.

A further object is to provide spring means in the form of a spring member which is not in surrounding relation to the cord, and therefore can be of a size and strength entirely independent of the cross-section of the cord, as distinguished from a helical type of spring disposed about the cord and which much have an interior diameter larger than the greatest transverse dimension of the cord, and which in the case of a flat relatively wide cord would necessitate an unusually large diameter spring.

A still further object is to provide an escutcheon plate adapted to interlock with the spring supporting part of the bracket in such a way as to conceal the attaching portion and screw of the spring supporting part, and which escutcheon plate is adapted to be attached by a single screw.

With the above and other objects in view, embodiments of the invention are shown in the accompanying drawings, and these embodiments will be hereinafter more fully described with reference thereto, and the invention will be finally pointed out in the claims.

In the drawings:

Fig. 1 is a front elevation of the bracket according to the illustrated exemplary embodiment of the invention, and showing the same attached to the seat back with the end of the robe supporting cord engaged therein.

Fig. 2 is a longitudinal sectional view of the bracket and cord assembled with the automobile body structure, being taken along the line 2—2 of Fig. 1.

Fig. 3 is an front elevation of the spring supporting part of the bracket attached to the seat back, the robe supporting cord and escutcheon plate being removed.

Fig. 4 is a vertical sectional view taken along the line 4—4 of Fig. 2.

Fig. 5 is a perspective view showing the end of the robe cord and the clip therefor, the latter being in its condition prior to assembly with the robe cord.

Fig. 6 is a longitudinal sectional view of a modified form of the invention.

Fig. 7 is a rear elevation.

Fig. 8 is a sectional view taken along the line 8—8 of Fig. 6.

Similar reference characters indicate corresponding parts throughout the several figures of the drawings.

Referring to the drawings the robe rail bracket, according to the exemplary illustrated embodiment of the invention shown therein, is adapted to be mounted upon the front seat back 10, which is formed of sheet metal and is covered with a covering of upholstery material 11, the drawing showing one end portion of the seat back which is curved toward its ends, it being understood that the other end portion is of similar but reversed form.

For the purpose of attaching the bracket, the seat back is provided with a rectangular hole 12, clinch nuts 13 and 14 being provided in the seat back along the center line of the hole 12, the clinch nut 13 being adjacent the inner edge of the hole 12 and the clinch nut 14 being substantially spaced from the outer edge, these clinch nuts being for the respective attachment of the spring supporting member and the escutcheon plate, as will presently more fully appear.

The spring supporting member consists of a sheet metal plate 15, slightly narrower than the width of the hole 12, so that it may be inserted therein, and provided at its outer end with an outwardly offset attaching portion 16, having a countersunk screw hole 17 therein, and which is engaged upon the outer side of the seat back adjacent the inner edge of the hole 12 and secured by a screw 18 engaged in the clinch nut 13. The attaching portion 16 is provided with an outwardly offset lip 19 for interlocking engagement of the escutcheon plate as will hereinafter more fully appear. A pair of inwardly bent retaining lugs 16a—16a are lanced and bent from the portion 16 near its side edges and these are adapted to engage the seat back at the inner side to retain the spring supporting member while the screw 18 is being secured.
The member 15 is curved inwardly and extends at its inner end to a point spaced from the inner surface of the seat back for a substantial distance beyond the outer edge of the hole 12. At one edge of the member 15 there is provided an inwardly bent spring supporting bracket portion 20, having its inner portion transversely offset by means of a bend 21 and provided with a T-shaped lug 22 lanced and bent therefrom, and which lug is adapted to have the angularly bent end 23 of the spiral spring 24 interlockingly engaged and supported thereon. As is evident from Fig. 2, the length of the lug 22 is no greater than the diameter of the inner coil of the spring so that the spring may be first loosely engaged with the lug 22 the lug passing through the central opening of the spring adjacent and parallel to the spring end 23, the spring being then interlocked with the lug by swinging the spring to the left about the upper end of the lug engaged by the bend of the end portion 23 causing said bend to engage one end of the lug 22 while the other end of the lug is engaged by the inner surface of the inner coil to the right of the end 23. The outer end of the spring extends through a slot 25 in the member 15 and is provided with a hook 26 at its end, to which the end clip of the cord is adapted to be connected, as will presently more fully appear, the outer end of the slot 25 acting as a stop to limit the expansion of the spring in cord pulling direction.

The member 15 is provided at the opposite edge from the bracket portion 20 with a finger portion 27 bent in the opposite direction from said bracket portion 20, and which extends through the hole 12 in the seat back for the purpose of engaging the inner surface of the escutcheon plate to act as a rigid supporting strut for the member 15, as will hereinafter more fully appear. The inner end of the member 15 is substantially narrower than the outer end for the purpose of providing a slide support for the robe rail clip, and stop shoulders 28 and 29 are provided at the end of this narrow inner end portion to limit the movement of the robe rail clip when the robe rail is drawn outwardly against the spring, the shoulder 28 being formed by lancing and bending outwardly a lug portion 30 from the bracket portion 20, and the shoulder 29 being formed as a continuation of one edge of the finger 27.
The escutcheon plate member 31 is provided with a rim flange 32 and has an opening 33 formed therein of substantially rectangular form, and which extends diagonally through the plate, the portion of the plate adjacent the inner edge of this opening being recessed as at 34 for this purpose, and the outer and side edges being provided with an inwardly curled flange 35, the recessed portion 34 forming a diagonally disposed slide bearing for the under surface of the cord, while the curled flange 35 provides a bearing surface for the outer surface. At the inner end of the escutcheon plate there is provided an inwardly bent flange 36 which interlockingly engages beneath the lip 19 of the spring supporting member, so that the inner end of the escutcheon plate encloses and conceals the attaching portion 16 and the screw 18 of the spring supporting member. The outer end of the escutcheon plate is provided with a countersunk screw hole 37 in which a screw 38 is engaged and screwed into the clinch nut 14, the interlocking connection of the flange 36 with the lip 19 and the securing of the screw 38 rigidly connecting the escutcheon plate to the seat back. In this rigidly connected relation the finger 27 rigidly supports the spring supporting member through its engagement by the inner surface of the escutcheon plate.

The robe cord, which is of flattened cross-section consists of an inner core 39, in the form of a flat ribbon-like strip of steel, and over which there is engaged a sleeve 40 of rubber, the outer fabric covering 41 being engaged or woven about the sleeve 40. The clip which is secured to the end of the cord for the purpose of providing a connection with the spring consists of a plate 42 having a lug 43 lanced therefrom to provide a slot 44, there being bendable ears 45 and 46 at each side of the lug 43 respectively provided in their end edges with notches 47 and 48. The plate 42 is provided at its outer end with a pair of fingers 49 and 50 bent at right angles to the plate and which are adapted to position and guide the clip upon the spring supporting member 15 and to cooperate with the stop shoulders 28 and 29 to limit the outward pull of the cord, as will presently more fully appear.

The strip is attached to the end of the cord by first providing a hole 51 through the cord near its end and which hole extends through the metal strip 39. The lug 43 is engaged through this hole and thereupon the ears 45 and 46 are bent into clinching relation about the end of the cord with the notches 47 and 48 engaging the lug. The lug is then bent downwardly upon the ears 45 and 46 and thus the clip is securely connected to the cord, the lug being interlocked with the metal strip 39 and further being interlocked with the ears 45 and 46 of the clip, so that longitudinal pull upon the cord will not cause the clip to loosen.

The cord and clip are connected to the bracket by engaging the end 26 of the spring with the slot 44 of the clip, the fingers 49 and 50 being disposed in sliding engagement at each side of the narrow inner end portion of the spring supporting member 15. Normally the cord will be under tension in which case the spring end will be out of engagement with the outer end of the slot 25, it being understood that the cord is supported at its other end in a similar manner or by a fixed bracket. Outward pull upon the cord will cause the clip to tension the spring, this outward pull being limited by abutment of the fingers 49 and 50 with the shoulders 28 and 29.
The assembly of the cord with the bracket is conveniently carried out by first threading the escutcheon plate on the cord prior to attachment of the escutcheon plate, and thereupon engaging the clip through the hole 12 and connecting it with the hook end 26 of the spring, this being more easily accomplished with the escutcheon plate unattached so that the hole 12 is entirely exposed. When the cord is thus secured the escutcheon plate is fixed in place by first engaging the flange 36 beneath the lip 19 and then securing the other end by means of the single screw 38. The bracket cord and clip may be assembled before attachment to the body structure, the assembled parts being inserted through the hole 12, and then fitted in place by engagement of the lugs 16ᵃ with the seat back at the inner edge of the hole 12. The screw 18 is then secured and the escutcheon plate which has been threaded on the cord before assembly of the bracket is positioned and secured by the screw 38.

In Figs. 6 to 8 I have illustrated a modified form of invention which is substantially similar to the modification shown in Figs. 1 to 5, except for the arrangement of the spring, the spring in the present embodiment being arranged in a plane parallel to the spring supporting member as distinguished from the spring 24 which is arranged in a plane at right angles of the spring supporting member.

The spring supporting member 15ᵃ is provided along the side edges of its inwardly extending portion with forwardly bent flanges 52—52 which are provided with extension portions 53 which extend through the hole 12 in the seat back and engage the inner surface of the escutcheon plate 31 to rigidly support the spring supporting member in a similar manner to the finger portion 27 of the first embodiment. A longitudinal slot 54 is provided centrally of the member 15ᵃ through which the robe cord clip has sliding engagement, as will presently more fully appear. In outwardly spaced relation to the outward end of this slot there is provided an inwardly embossed spring connecting portion 55 having a passage 56 therethrough in which the hooked end 57 of the spiral spring 58 is engaged and retained, the other hooked end 59 of this spring being adapted to be engaged with the robe cord clip.

The robe cord 60 illustrated in this embodiment is of flat cross-section, but is not provided with a metal core as in the case of the robe cord illustrated in the first embodiment. It is formed of sponge rubber encased in fabric and the clip is clamped to its end, this clip 61 being in the form of a U-shaped member embracing the end of the cord and having inwardly bent toothed flanges 62 and 63 which bite into and secure the clip to the end of the cord. The lower side of the clip is provided at its ends with inwardly bent end portions 64 and 65 which engage and confine the side edges of the cord, and is provided centrally with a slot 66 in which is engaged a lug member 67 formed by bending a strip of sheet metal upon itself, and which lug member is bent outwardly, as at 68, within the clip to secure it in place. The lug member is adapted to slidably engage the slot 54 and a hole 69 is provided therein at the rearward side of the member 15ᵃ through which the hooked end 59 of the spring 58 is engaged, the engagement of the spring with the clip retaining the clip in place.

The spring exerts inward pull on the cord, being limited in its expansion by engagement of the clip with one end of the slot 54, and the outward pull on the cord being limited by engagement of the clip with the other end of the slot.

As in the case of the first embodiment, the spring, cord, and spring supporting member may be assembled before attachment to the seat back with the escutcheon plate loosely threaded upon the cord, the spring supporting member then being inserted through the hole 12 of the seat back and being secured in place by first engaging the lugs 16ᵃ with the inner edge of the hole and then fastening the screw 18. When the screw 18 is fastened the escutcheon plate is fitted in place and secured by fastening of the screw 38.

I have illustrated and described preferred and satisfactory embodiments of the invention, but it will be obvious that changes may be made therein, within the spirit and scope thereof, as defined in the appended claims.

Having thus described my invention what I claim and desire to secure by Letters Patent is:

1. In a bracket for an automobile robe rail cord or the like for attachment to an automobile body structure or the like, said body structure having an opening therein, a spring mounting member having a securing end portion adapted to be engaged with said body structure at one side of said opening and extending within said body structure, securing means directly securing said mounting member to said body structure, a spring mounted upon said spring mounting member, a robe rail cord extending through said opening to the interior of said body structure along a line removed from the central axis of said spring, a clip member secured to the end of said cord and removably engaged by the end of said spring, said spring adapted to exert inward pull upon said cord, stop means on said spring mounting member for limiting the movement of said spring in cord pulling direction, and stop means on said spring mounting member for limiting the outward movement of said cord, an escutcheon plate member adapted to engage said body structure opening and having a cord engaging opening through which said cord extends and securing means for directly securing said escutcheon plate member to said body structure independently of said first securing means.

2. In a bracket for an automobile robe rail cord or the like for attachment to an automobile body structure or the like, said body structure having an opening therein, a spring mounting member adapted to be secured to said body structure at one side of said opening comprising a cord supporting portion extending from said side of said opening diagonally within said body structure and having a slot and a spring mounting bracket portion extending inwardly from said cord supporting portion, a spiral spring having one end mounted upon said bracket portion and at its other end engaged in said slot and limited in its expanding movement by engagement with one end of said slot, a robe rail cord extending through said opening to the interior of said body structure, a clip member secured to the end of said cord and slidably engaging said cord mounting portion and having means engaged by said other end of said spring, said spring adapted to exert inward pull upon said cord.

3. In a bracket for an automobile robe rail cord or the like for attachment to an automobile body structure or the like, said body structure having an opening therein, a spring mounting member adapted to be secured at one end to said body structure at one side of said opening and extending within said body structure, a spring mounted upon said spring mounting member, a robe rail cord extending through said opening its other end being unsecured to the interior of said body structure, a clip member secured to the end of said cord and removably engaged by the end of said spring, said spring adapted to exert inward pull upon said cord, stop means on said spring mounting member for limiting the movement of said spring in cord pulling direction, stop means on said spring mounting member for limiting the outward movement of said cord, an escutcheon plate member having a cord engaging opening and secured to the outer side of said body structure, and means on said spring mounting member extending through said opening in said body structure and engaging said escutcheon plate member at its inner side to space the inner end of said spring mounting member from the inner surface of said body structure.

4. In a bracket for an automobile robe rail cord or the like for attachment to an automobile body structure or the like, said body structure having an opening therein, a spring mounting member having a securing portion adapted to be secured to said body structure at its outer side at one side of said opening and a portion extending through said opening to the interior of said body structure, said securing portion having an outwardly offset lip, a spring mounted upon said spring mounting member, a robe rail cord extending through said opening to the interior of said body structure, a clip member secured to the end of said cord and removably engaged by the end of said spring, said spring adapted to exert inward pull upon said cord, stop means on said spring mounting member for limiting the movement of said spring in cord pulling direction, stop means on said spring mounting member for limiting the outward movement of said cord, an escutcheon plate having a cord receiving opening and provided at one end with an inwardly bent lip adapted to be interlockingly engaged with said lip of said spring mounting member, and means for securing the other end of said escutcheon plate to said body structure at the other side of said body structure opening, said escutcheon plate being detachable from said body structure independently of said spring mounting member.

5. In a bracket for an automobile robe rail cord or the like for attachment to an automobile body structure or the like, said body structure having an opening therein, a spring mounting member adapted to be secured to said body structure at one side of said opening and extending within said body structure, a spring mounted upon said spring mounting member, a robe rail cord comprising a metal core and a sleeve surrounding said core, there being a hole near the end of said cord extending through said metal core, a clip member engaged about said end of said cord and having means extending through said hole to interlockingly secure said clip member to said core, said clip member being engaged by the end of said spring, said spring adapted to exert inward pull upon said cord through said clip and metal core.

6. In a bracket for an automobile robe rail cord or the like for attachment to an automobile body structure or the like, said body structure having an opening therein, a spring mounting member adapted to be secured to said body structure at one side of said opening and extending within said body structure, a spring mounted upon said spring mounting member, a robe rail cord of flat cross-section comprising a flat ribbon-like metal core and a sleeve surrounding said core, there being a hole near the end of said cord extending through said metal core, a clip member engaged about said end of said cord and having means extending through said hole to interlockingly secure said clip member to said core, said clip member being engaged by the end of said spring, said spring adapted to exert inward pull upon said cord through said clip and metal core.

ARTHUR CLAUD-MANTLE.